April 23, 1935. E. A. ROSIN 1,998,968
CUTTING MACHINE
Filed Nov. 23, 1932 4 Sheets-Sheet 1
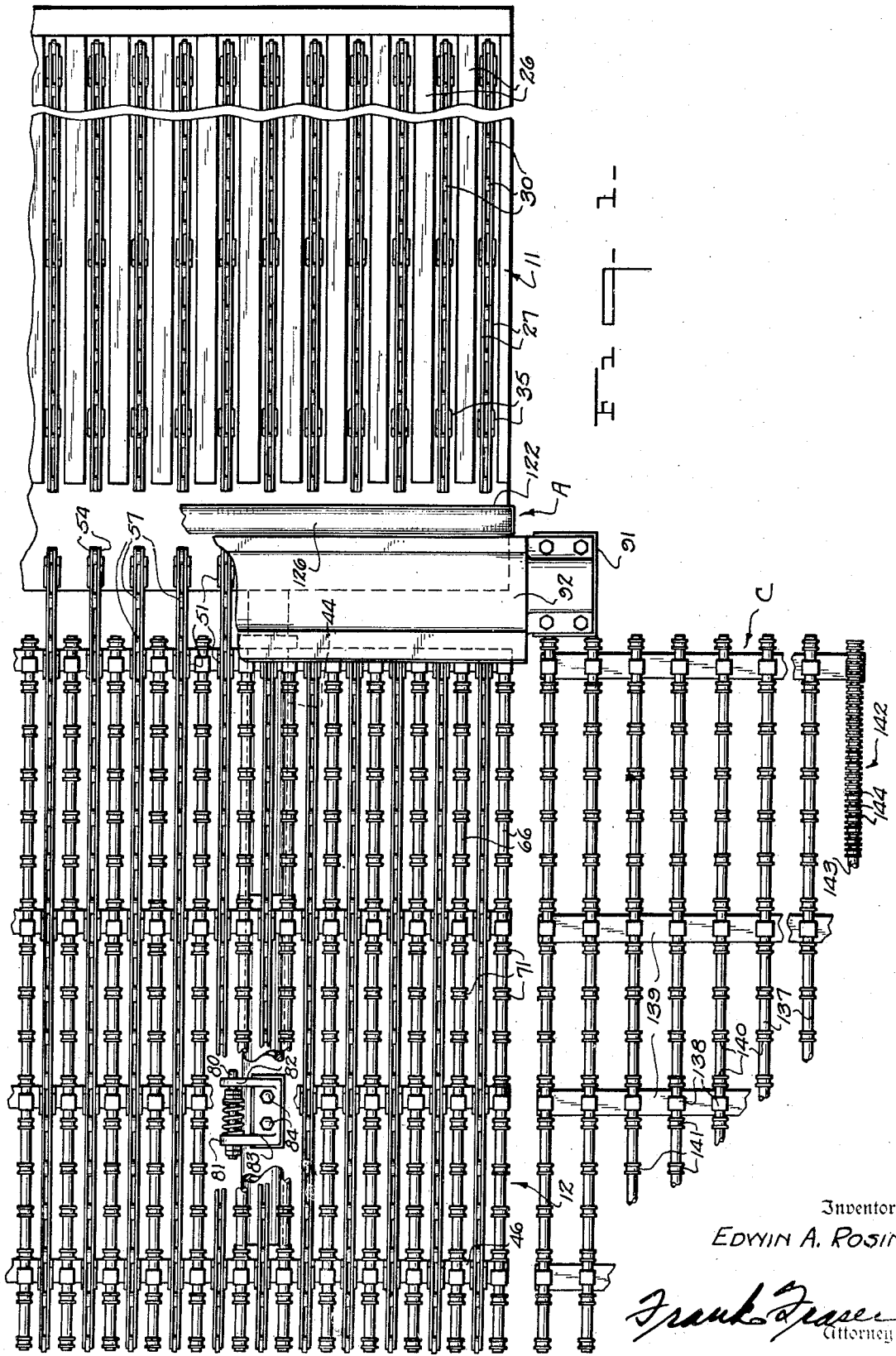
Inventor
EDWIN A. ROSIN.
Frank Fraser
Attorney

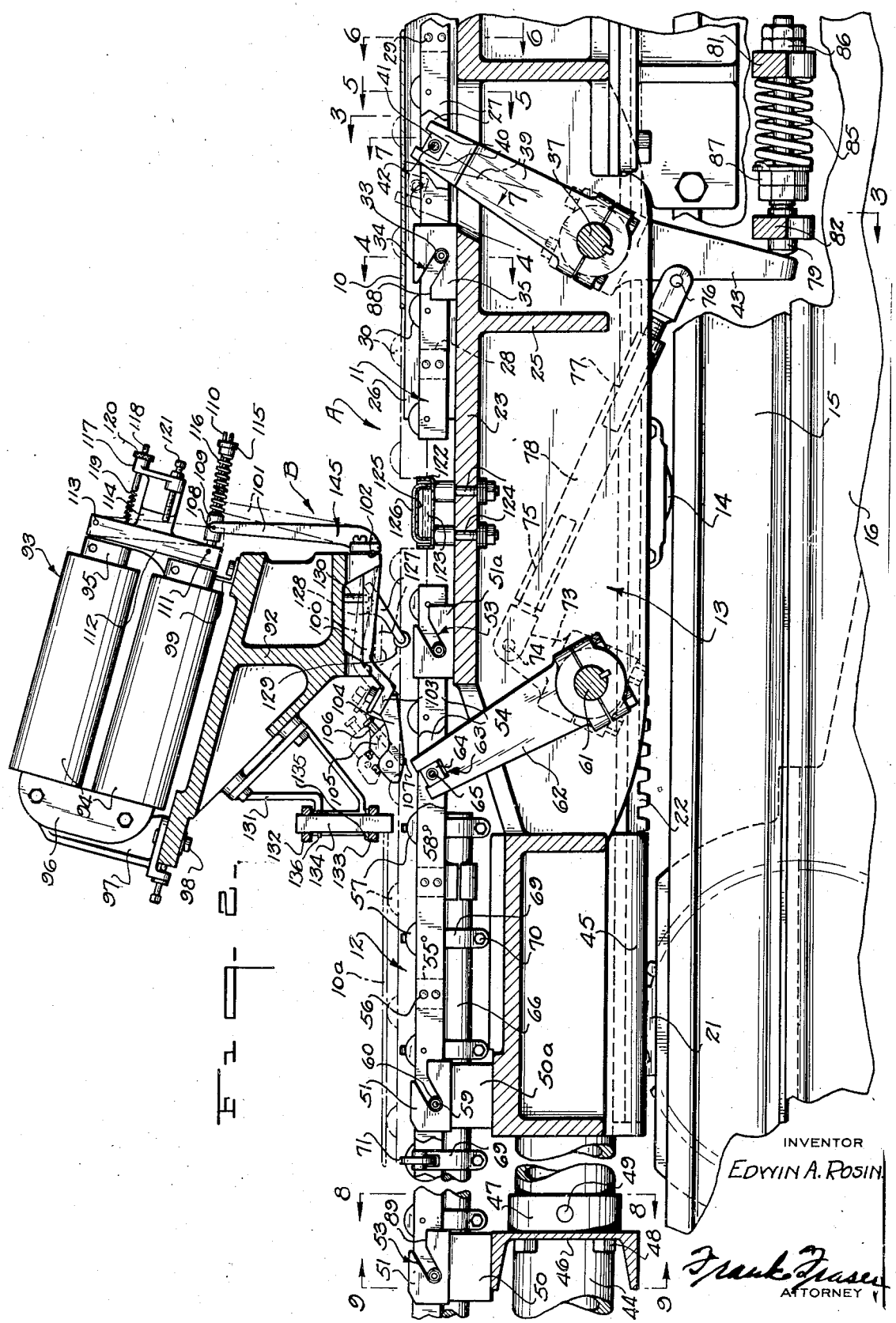

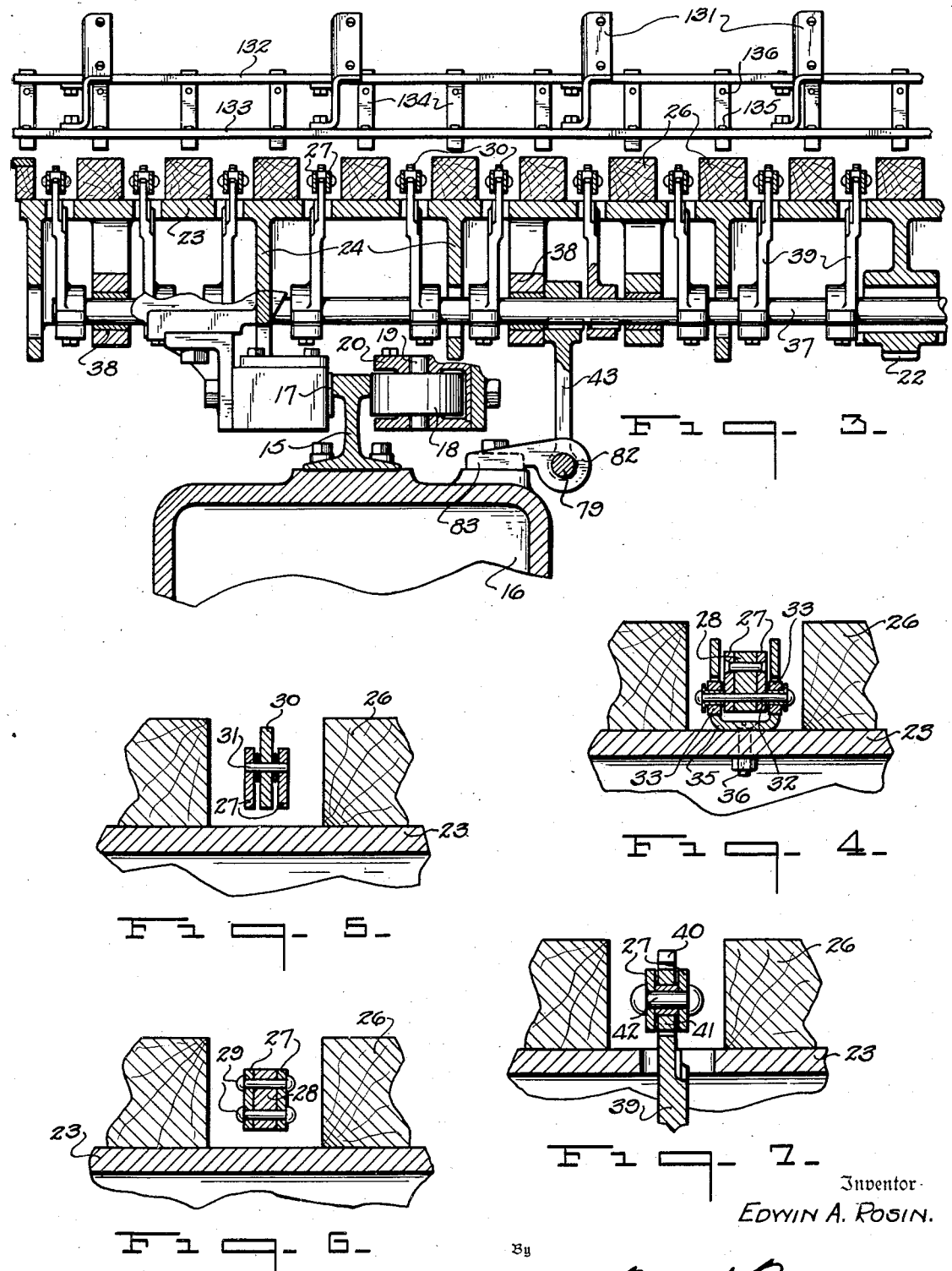

Inventor
EDWIN A. ROSIN.

By Frank Fraser
Attorney

Patented Apr. 23, 1935

1,998,968

UNITED STATES PATENT OFFICE 1,998,968

CUTTING MACHINE

Edwin A. Rosin, Toledo, Ohio, assignor to Libbey-Owens-Ford Glass Company, Toledo, Ohio, a corporation of Ohio Application November 23, 1932, Serial No. 644,025

16 Claims. (Cl. 33—32)

The present invention relates broadly to cutting apparatus and more particularly to improvements in a machine designed especially for use in the cutting of glass sheets or plates but which may also be used for cutting other sheet material.

In my copending application Serial No. 564,039, filed September 21, 1931, there is disclosed in detail a machine for cutting glass sheets or plates into a plurality of smaller sizes, as required, to obtain true edges, effect the elimination of defects, or both. This machine was designed to do away with the operation of hand cutting and to effect either a single cutting operation or a plurality of cutting operations simultaneously whereby the time required for cutting up a sheet of glass is materially reduced and the effort on the part of the operator correspondingly lessened. Briefly stated, the machine of my copending application embodies a horizontal reciprocating cutting table for supporting the glass sheets to be cut and a cutting mechanism mounted thereabove, said cutting mechanism being stationary and the table being movable back and forth therebeneath.

This invention constitutes an improvement upon the machine disclosed in the above-mentioned application and has for one of its primary objects the provision of a cutting table of novel and simplified construction for supporting the glass sheets to be cut and which will lend itself to the cutting of the glass in a rapid and efficient manner.

Another important object of the invention is the provision of a cutting table including a cutting section and a receiving section together with means associated with said table for effecting the automatic transfer of the glass, subsequent to cutting, from said cutting section onto said receiving section.

Other objects and advantages of the invention will become more apparent during the course of the following description when taken in connection with the accompanying drawings.

Figure 8:
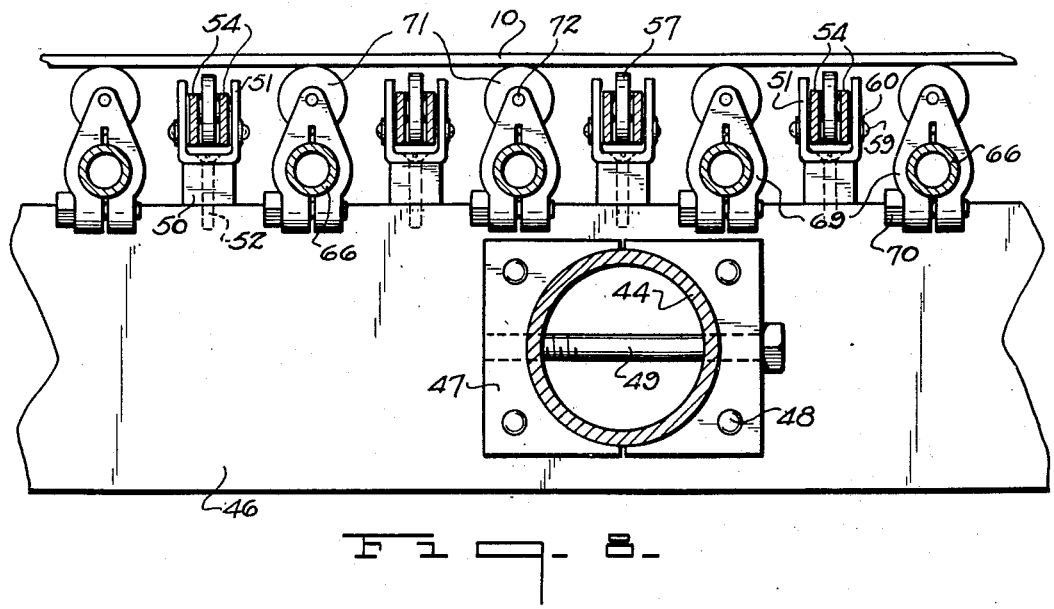
Figure 9:
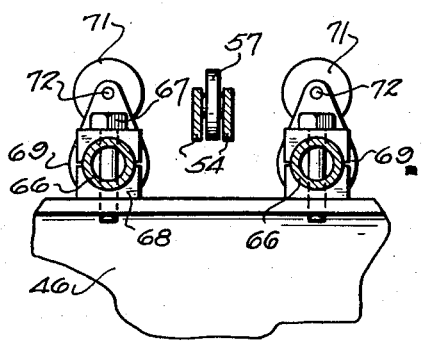

In the drawings forming a part of this application and wherein like numerals are employed to designate like parts throughout the same, Fig. 1 is a plan view of approximately one-half of an improved cutting table constructed in accordance with the present invention, Fig. 2 is a vertical longitudinal section through a portion thereof, and Figs. 3, 4, 5, 6, 7, 8 and 9 are vertical sectional views taken substantially on lines 3—3, 4—4, 5—5, 6—6, 7—7, 8—8 and 9—9 respectively of Fig. 2.

Referring now to the drawings, the cutting machine illustrated therein includes generally a horizontal reciprocating cutting table A adapted to support the sheets or plates of glass 10 to be cut and being movable back and forth beneath the cutting mechanism B which is mounted in a relatively fixed position above said table. That is to say, the cutting mechanism B remains stationary while the cutting table A is reciprocated therebeneath.

The table A is divided longitudinally into two principal portions or sections 11 and 12 respectively, the former constituting the cutting section upon which the glass sheets 10 are supported during cutting and the latter serving as a receiving section for receiving the glass from the cutting section after the cutting thereof as will be more fully hereinafter apparent.

The cutting section 11 of table A includes a main body portion or casting 13 substantially rectangular in plan and supported at each side thereof and also adjacent each end upon wheels 14 (Fig. 2) which are mounted to run along a horizontal rail 15 carried by the supporting or sub-structure 16. In order to prevent any lateral vibratory movement of the table during the reciprocatory travel thereof, there may be provided at one side of the said table a suitable number of pairs of rollers 17 and 18 (Fig. 3) which engage opposite sides of the corresponding rail 15. Each roller 17 and 18 is mounted upon a vertical pin 19 carried by a housing 20 secured to casting 13. The table A may be reciprocated upon the rails 15 by means of a reversible drive pinion 21 meshing with a rack bar 22 carried by the underside of said table and driven in any convenient manner.

The main table casting 13 comprises a flat horizontal top member or plate 23 having formed integral with the underside thereof a plurality of longitudinally extending depending flanges 24 and a plurality of depending transverse flanges 25. Carried upon the top plate 23 of casting 13 are a plurality of longitudinally extending transversely spaced preferably wooden beams 26. Positioned within the space between any two adjacent beams 26 is a pair of spaced longitudinally extending metal strips 27 secured together and at the same time held properly spaced from one another by a series of blocks 28 and rivets or other fastening elements 29 (Fig. 6.) Arranged between and carried by the strips 27 of each pair are a plurality of relatively small discs or rollers 30 mounted upon pins 31 (Fig. 5), and which rollers project upwardly above the upper edges of the said strips as shown.

Each pair of strips 27 is supported adjacent its opposite ends and also intermediate its ends, as desired, upon transverse pins 32 (Fig. 4) which extend through the said strips and spacing blocks 28 and which carry at their outer ends the freely rotatable rollers 33 received within the inclined slots 34 (Fig. 2) formed in the substantially U-shaped supporting member 35, said supporting members being secured to the casting 13 by bolts or other suitable fastening elements 36. It will be noted upon reference to Fig. 2 that the slots 34 in supporting members 35 incline upwardly toward the center of the table and also that they are open at their upper ends.

Positioned beneath the top 23 of casting 13 and extending transversely of the table is a horizontal rocker shaft 37 mounted within bearings 38 carried by said casting. Fixed upon the shaft 37 are a plurality of upwardly projecting substantially vertical arms 39, one being provided for each pair of metal strips 27 as best shown in Fig. 3. The upper end of each rocker arm 39 is bifurcated (Fig. 2) to provide the spaced parallel legs 40 which are adapted to straddle a rectangular and preferably square block 41 positioned between the respective strips 27 and freely mounted upon a transverse pin 42 carried by the said strips (Fig. 7).

Also carried by the shaft 37 and depending therefrom adjacent each side of the table is an operating lever 43, and upon rocking movement of these levers to rotate the shaft 37, it will be readily apparent that the arms 39 will be swung through an arc to effect the simultaneous raising or lowering of the several pairs of strips 27 and the rollers 30 carried thereby, depending upon in which direction the said arms are swung. The strips 27 and rollers 30 are guided in their vertical movements by the rollers 33 operating within the inclined slots 34 of the substantially U-shaped supporting members 35. When the rollers 30 are in lowered position, they are disposed slightly beneath the upper surfaces of the wooden beams 26 and when in raised position project slightly thereabove.

The receiving section 12 of the cutting table A includes a horizontally disposed tubular supporting member 44 of relatively large diameter (Fig. 8) positioned adjacent each side of the table and extending longitudinally thereof. Each of these members 44 is secured at its inner end to the main table casting 13, being mounted within a hub 45. The members 44 adjacent opposite sides of the table are connected together at their opposite ends and also intermediate their ends, if desired, by a plurality of cross members 46, said cross members being in the form of channel beams as best shown in Fig. 2, and having openings therein through which the said members 44 are received. The cross beams 46 are secured to split collars 47 by means of suitable fastening elements 48, said collars 47 encircling the tubular members 44 and being in turn secured thereto by fastening elements 49.

Supported upon the cross beams 46 are a plurality of blocks 50 and carried by each block is a substantially U-shaped supporting member 51 secured to the respective cross beam by a suitable fastening element 52 (Fig. 8) which also passes downwardly through the corresponding block 50 to secure the same to said beam. Supported upon the adjacent end of the main casting 13 are a plurality of blocks 50a which also carry supporting members 51. A plurality of similar supporting members are also supported directly upon the top 23 of casting 13, as shown at 51a. The supporting members 51 are all arranged in horizontal alignment with one another and likewise in horizontal alignment with the supporting members 35 carried by the cutting section 11 of the table.

The supporting members 51 are of substantially the same construction as the supporting members 35 described hereinabove, each being provided with aligned slots 53 in the opposite sides thereof, said slots also inclining upwardly toward the center of the cutting table and being open at their upper ends. Thus, it will be seen that the slots 53 in supporting members 51 are oppositely inclined with respect to the slots 34 in supporting members 35.

Carried by the supporting members 51 are a plurality of pairs of metal strips 54 (Fig. 8) similar to the strips 27 carried by supporting members 35 and being arranged in substantial alignment therewith. The strips 54 of each pair are maintained spaced from one another by the spacing blocks 55 (Fig. 2) being secured together by rivets 56 passing through the said strips and spacing blocks. Positioned between the strips 54 of each pair are a plurality of discs or rollers 57 freely rotatable upon pins 58. The upper portions of the rollers 57 project above the upper edges of the strips 54 and are arranged at the same horizontal level as rollers 30. Passing transversely through each pair of strips 54 are a plurality of pins 59 carrying outwardly of the said strips, rollers 60 which are received within the inclined slots 53 in supporting members 51.

Carried by the main casting 13 of the cutting table and extending transversely thereof is a shaft 61 in substantial horizontal alignment and also parallel with shaft 37. Mounted upon shaft 61 are a plurality of substantially vertical arms 62, one being provided for each pair of strips 54 and having its upper end bifurcated to provide a recess 63 within which is loosely received a rectangular and preferably square block 64 positioned between the strips and freely mounted upon a transverse pin 65. Thus, it will be seen that upon rocking of the shaft 61, the arms 62 will be swung through an arc to effect the simultaneous raising or lowering of the several pairs of metal strips 54 and the rollers 57 carried thereby, depending upon in which direction the said arms are swung; the said strips and rollers being guided in their vertical movements by the rollers 60 operating within the inclined slots 53 of the U-shaped supporting members 51.

Also carried by the cross beams 46 and extending longitudinally of the table are a plurality of tubular supporting members 66, said members being positioned between adjacent pairs of strips 54 and arranged parallel therewith. The tubular members 66 are secured to the cross beams 46 by screws or the like 67 (Fig. 9), which pass downwardly through the said tubular members, and also through the split clamping blocks 68, the two parts of which fit about the tubular members with the said members being supported directly upon the lower portions of the blocks. Mounted upon each tubular member 66 are a plurality of spaced brackets 69 fitting around the tubular member and clamped thereto by screws or the like 70. Carried at the upper end of each bracket 69 is a disc or roller 71 freely mounted upon a transverse pin 72. It will be noted that the axes of rotation of the rollers 71 are disposed at substantially right angles with respect to the axes of rotation of rollers 57. In other words, the rollers 57 rotate about axes extending transversely of the cutting table while the rollers 71 rotate about axes extending longitudinally of said table. When the rollers 57 are in lowered position, they are disposed slightly beneath the level of the rollers 71, whereas when in raised or elevated position, the tops of the said rollers 57 project slightly above the tops of rollers 71.

According to the present invention, the rollers 30 carried by the cutting section 11 of table A, and the rollers 57 carried by the receiving section 12 thereof, are adapted to be operated simultaneously. That is to say, they are adapted to be raised and lowered in unison so that they remain at all times in alignment with one another whether in raised or lowered position. In order to effect this simultaneous operation, there is keyed to the shaft 61 adjacent each side of the table a lever 73, and pivoted to the outer end of each lever as at 74 is an eye screw 75. Also pivoted to each of the levers 43 as at 76 is an eye screw 77, said eye screws 75 and 77 being connected together by a sleeve 78 threaded thereupon whereby to provide for adjustment of the levers 43 and 73 with respect to one another. The threads on the eye screws 75 and 77 are so arranged that upon rotation of the sleeve 78, the said eye screws will both be moved either outwardly or inwardly with respect to the sleeve. From the above, it will be seen that upon actuation of the levers 43 to rock the shaft 37, such rocking movement will be transmitted to the shaft 61.

Positioned adjacent the front end of the machine, at each side thereof, is a stop member 79 (Fig. 2) against which the lower ends of levers 43 are adapted to abut upon forward movement of the table, while a similar stop member 80 (Fig. 1) is provided adjacent the rear end of the machine and at each side thereof and against which the said levers 43 are adapted to abut upon rearward movement of the table. Each stop member 79 and 80 consists of a horizontal bolt which is passed loosely through the opposed legs 81 and 82 of a substantially U-shaped bracket 83 secured by screws or other fastening elements 84 to the supporting structure 16. Encircling the bolt between legs 81 and 82 is a compression spring 85 which tends to urge the said bolt inwardly, such inward movement being limited by nuts 86 threaded upon the outer end of said bolt. The spring 85 bears at one end against the leg 81 and at its opposite end upon nuts 87 threaded upon the intermediate portion of the bolt. By proper adjustment of the nuts 87, the pressure of the spring 85 can be regulated, as desired, whereas the extent to which the bolt projects inwardly can be varied by adjustment of nuts 86. This latter adjustment is very important in order that the levers 43 will engage the stop bolts 79 and 80 at the proper instant or, in other words, when the said table reaches a predetermined position.

With such a construction and arrangement as above described, it will be readily apparent that as the cutting table A moves forwardly and the lower ends of levers 43 engage stop bolts 79 to rock the shaft 37 in a clockwise direction, the upper ends of the rocker arms 39 will be swung to the right which will move all of the metal strips 27 forwardly. When this is done, the rollers 33 will move into the lower ends of the slots 34 in supporting members 35 and thereby cause the glass supporting rollers 30 to be lowered beneath the upper surfaces of the wooden beams 26 as shown by the full lines in Fig. 2.

Upon rocking of the levers 43 in this manner, the shaft 61 will be simultaneously rocked in a counter-clockwise direction, with the result that the arms 62 will be swung to the left to move all of the strips 54 rearwardly, thereby causing the rollers 66 to move downwardly within the slots 53 in supporting members 51 with the result that the glass supporting rollers 57 will be located slightly beneath the tops of the rollers 71 as also indicated by full lines in Fig. 2. However, when the cutting table is moved rearwardly and the levers 43 engage stop bolts 80, the arms 39 will be swung in a counter-clockwise direction to raise the strips 27 and rollers 30, and simultaneously the arms 62 will be swung in a clockwise direction to raise the strips 54 and rollers 57.

When the rollers 30 and 57 are in raised position, they will assume the positions indicated by the broken lines in Fig. 2 and will project slightly above the wooden beams 26 and rollers 71 respectively. When the glass supporting rollers 30 and 57 are moved into elevated position, the rollers 33 will rest upon the flat upper edges 88 of the supporting members 35, while the rollers 66 will rest upon the flat upper edges 89 of the members 51. In this way, the glass supporting rollers 30 and 57 will be maintained in elevated position until lowered by the engagement of the levers 43 with the stop bolts 79 upon forward movement of the cutting table.

Although the present invention is not limited to any specific type of cutting mechanism, yet the cutting mechanism B is preferably the same or substantially the same as that disclosed in my above-identified copending application and to which reference may be had for a more detailed disclosure thereof. Consequently, only those portions of the cutting mechanism which are necessary for a complete understanding of the present invention have been herein disclosed. Briefly stated, the cutting mechanism B embodies a vertical stationary standard 91 (Fig. 1) located at each side of the machine and having secured to the upper ends thereof a cross member or beam 92, said beam being arranged transversely above the table A and supporting a series of cutting units arranged side by side, one unit being illustrated in Fig. 2 and designated in its entirety by the numeral 93. The cutters are preferably, although not necessarily, spaced about one inch apart.

Each cutting unit 93 includes a pair of relatively thin electro-magnets 94 positioned one above the other and each consisting of a metal core 95 about which is wound the usual coil. The cores 95 for each pair of magnets form the customary horseshoe magnet by being integral with their connecting member 96 which is secured to a bracket 97 which is in turn secured to the cross member 92 by screws or other fastening elements 98. The forward ends of the said magnets are supported upon plates 99.

Each of the cutting units 93 also includes a substantially L-shaped lever 145 comprising a substantially horizontal tool supporting arm 100 and a substantially vertical arm 101, said lever being pivotally mounted intermediate its ends upon a horizontal pin 102 carried by the cross member 92. The horizontal portion 100 of the lever is provided with an offset foot 103 carrying a shoe 104 having an arcuately shaped bottom. Carried by the shoe is a cutter holder 105 carrying the cutter ferrule 106 to the lower end of which is secured the cutting diamond 107.

The upper end of the vertical arm 101 of each lever is bifurcated and has pivoted thereto as at 108 a sleeve 109. This sleeve is slidably mounted upon a split bolt 110 pivoted at its inner end as at 111 to a bar or armature 112 which in turn has a pivotal mounting at its upper end as at 113 with a bracket 114 fixedly carried by the cores 95 of the electro-magnets. Threaded upon the outer end of the split bolt 110 is a nut 115, and encircling the bolt and bearing at one end against the sleeve 109 and at its opposite end against the nut 115 is a compression spring 116 normally tending to urge the sleeve 109 and consequently the upper end of the lever arm inwardly. The pin 108 of course passes loosely through the slot in the split bolt 110.

Loosely received through the upper portion 117 of bracket 114 is a screw 118 having secured to its inner end a tension spring 119, the opposite end of said spring being connected to the bar 112 and acting to normally draw the said bar away from and out of engagement with the cores of the electro-magnets as indicated by the broken lines in Fig. 2. A nut 120 is threaded upon the outer end of screw 118 to adjust the tension of spring 119. Also carried by the portion 117 of bracket 114 is a stop screw 121 which serves to limit the outward movement of bar 112 about its pivot 113.

In practice, when the electro-magnets 94 are energized, the bar 112 will be drawn inwardly thereby against the action of spring 119, and of course the inward movement of bar 112 will cause the lever 145 to be rocked in a counter-clockwise direction upon pin 102 which will effect a lowering of the cutter diamond 107 into cutting position. However, upon de-energization of the electro-magnets, the spring 119 will function to swing the bar 112 outwardly so as to rock the lever in a clockwise direction to raise the cutter diamond 107 to a non-cutting position. The spring 116 serves to yieldably maintain the cutter in engagement with the glass during the cutting operation while at the same time allowing a rocking movement of the lever 145 to take care of any unevenness in the glass surface. In other words, the lever is permitted a rocking movement even when the bar 112 is held inwardly by the electro-magnets.

As pointed out above, the cutting units are preferably spaced approximately one inch apart throughout the width of the table and, as disclosed in my copending application, are preferably actuated by the operator through the medium of a keyboard positioned adjacent the front of the machine. The keyboard comprises a plurality of keys, one provided for and connected in circuit with the electro-magnets of the respective cutter so that the said cutters are independently movable at all times into and out of cutting position.

In order to facilitate the cutting operation and better the action of the cutting tools, it is desirable to oil the glass sheets or plates along the path to be travelled by said cutting tools. To this end, there is mounted upon the top of the table A between the adjacent ends of the pairs of strips 27 and 54, an oiling device comprising a reservoir 122 adapted to contain a quantity of oil 123, and being suitably secured in place by studs or the like 124. The oiling device also includes an inverted substantially U-shaped member 125 covered with a wick 126 of suitable material such as felt or the like, the down-turned edges of said wick being immersed within the oil so that the oil will pass upwardly by capillary attraction into and through said wick.

Also carried by the L-shaped lever 145 of each cutting unit 93 is an arm 127 pivoted to said lever as at 128 and carrying at one end a roller or wheel 129 of felt or some other suitable material. This roller is adapted to rest upon the upper surface of the oiling wick 126 when the table is in its normal inoperative position and when the cutters are lowered into cutting position. One of these wheels is provided for and positioned in alignment with each cutting diamond so that as the table is moved rearwardly through its cutting stroke, the wheels are run over the glass in advance of the cutters and oil the same whereby to facilitate and better the cutting action of the diamonds. The downward movement of each oiling wheel is limited by a stop pin 130 carried by the cross beam 92. The pivot point 128 is so positioned with respect to wheel 129 that when the cutters are lowered into cutting position, the said wheels are adapted to rest upon wick 126, whereas when the cutters are raised into non-cutting position, the wheels 129 are also adapted to be swung upwardly out of contact with the oiling device as shown in broken lines in Fig. 2.

After the cutting of the glass sheet has been completed and the cutters lifted therefrom, the glass is adapted to be shifted from the cutting section 11 of the table onto the receiving section 12 thereof. This is ordinarily accomplished in the following manner: Thus, there is secured to the cross beam 92, a plurality of spaced brackets 131 and carried by these brackets are the upper and lower horizontal metal bars 132 and 133, said bars extending transversely of the table and having vertically aligned openings therein through which are inserted the vertically disposed stops 134. As best shown in Fig. 3, the downward movement of these stops is limited by pins 135 engaging the lower bar 133, while their upward movement is limited by pins 136 engaging the upper bar 132. When the stop members are in their lowermost position, they project downwardly beneath the tops of the rollers 30 and 57 when the said rollers are in elevated position. However, since the stop members are positioned in line with the wooden beams 26, they in no way interfere with the reciprocating movement of the table nor with the raising and lowering of the rollers.

When the machine is in its normal inoperative position with the cutting table A at the forward end of its movement, as shown in Fig. 1, all of the cutting diamonds are preferably maintained in elevated non-cutting position due to the fact that at this time the magnets 94 are de-energized. Also, at such time the levers 43 are in engagement with stop bolts 79 so that the rollers 30 of the cutting section of the table are disposed slightly beneath the upper surfaces of the wooden beams 26, while the rollers 57 of the receiving section are disposed slightly beneath the tops of rollers 71.

The operator then places the glass sheet 10 to be cut upon the cutting section of the table where it is supported by the wooden beams 26. After inspecting the glass, the operator causes the energization of the desired magnets 94 to cause movement of the corresponding cutters into cutting position. The means for then moving the table is placed is operation and the table moved rearwardly beneath the cutting mechanism, whereupon those cutters which have been previously moved into cutting position will effect the scoring of the glass along the desired lines.

When the cutting table reaches the end of its rearward cutting stroke, the levers 43 engaging stop bolts 80 will effect the raising of the rollers 30, whereupon the sheet will be lifted up off of the wooden beams 26 and supported by said rollers. Simultaneously, the rollers 57 will be raised so that they project slightly above the rollers 71. As the table then moves forwardly, the forward edge of the glass sheet will abut the stops 134 and, upon continued forward movement of the table, the sheet will be transferred from the rollers 30 onto the rollers 57 as indicated at 10a in Fig. 2. When the table reaches the end of its forward or return stroke, the levers 43 engaging stop bolts 79 will cause a simultaneous lowering of the rollers 30 and 57, and it will be seen that upon lowering of the said rollers 57, the glass sheet will be transferred therefrom onto the rollers 71. The sheet can then be removed laterally from the cutting table. It will of course be understood that just prior to the raising of the rollers 30 and 57, the electro-magnets 94 will be de-energized so as to cause those cutters in cutting position to be moved upwardly out of cutting position.

If desired, there may be arranged to one side of the cutting machine and in a position opposite the receiving section of the table when said section is in its normal inoperative position (as shown in Fig. 1), an auxiliary receiving table C onto which the glass may be moved laterally from the receiving section of the cutting table. This auxiliary receiving table may be of any conventional or preferred construction, but as here shown comprises a plurality of spaced parallel tubular members 137 extending parallel with the tubular members 66 of the receiving section of the cutting table. The tubular members 137 are supported by blocks 138 mounted upon the spaced transversely arranged beams 139. Each of the tubular members 137 carries a plurality of bracket members 140 similar to bracket members 69 and which in turn carry the freely rotatable rollers or discs 141. Positioned at the outer end of the auxiliary receiving table C is a so-called take-off roll 142 consisting of a tubular supporting member 143 carrying a series of freely rotatable rollers or discs 144 which are preferably arranged relatively close to one another as shown.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers after the cutting has been completed thereby raising the sheet from the top of the table and supporting said sheet on the rollers of the cutting section, means for effecting the transfer of the glass from the rollers of the cutting section of the table onto the rollers of the receiving section thereof during forward movement of the said table, and means for simultaneously lowering said first and second series of rollers after the glass has been transferred from said cutting section onto said receiving section.

2. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising the first and second series of rollers when the table reaches the end of its rearward cutting stroke thereby raising the sheet from the top of the table and supporting said sheet on the rollers of the cutting section, means for effecting the transfer of the glass from the rollers of the cutting section of the table onto the rollers of the receiving section thereof during forward movement of the said table, means for maintaining both series of rollers in elevated position as the table moves forwardly, and means for simultaneously lowering the first and second series of rollers when the table reaches the end of its return stroke.

3. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, a stationary cross member positioned transversely above the table, means carried by said cross member for cutting the sheet during the rearward movement of the table, means for simultaneously raising the first and second series of rollers after the cutting has been completed thereby raising the sheet from the top of the table and supporting said sheet on the rollers of the cutting section, means carried by said cross member for effecting the transfer of the glass from the rollers of the cutting section of the table onto the rollers of the receiving section thereof during forward movement of the said table, and means for simultaneously lowering said first and second series of rollers after the glass has been transferred from said cutting section onto said receiving section.

4. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, a stationary cross member positioned transversely above the table, means carried by the cross member for cutting the sheet during the rearward movement of the table, means for simultaneously raising the first and second series of rollers when the table reaches the end of its rearward cutting stroke thereby raising the sheet from the top of the table and supporting said sheet on the rollers of the cutting section, means carried by said cross member for effecting the transfer of the glass from the rollers of the cutting section of the table onto the rollers of the receiving section thereof during forward movement of the said table, means for maintaining both series of rollers in elevated position as the table moves forwardly, and means for simultaneously lowering said first and second series of rollers when the table reaches the end of its return stroke.

5. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising and lowering the first and second series of rollers including a lever and operative connections between said lever and rollers, means for actuating said lever to simultaneously raise the two series of rollers after the cutting has been completed thereby raising the sheet from the top of the table and supporting said sheet on the rollers of the cutting section, means for effecting the transfer of the glass from the rollers of the cutting section of the table onto the rollers of the receiving section thereof during forward movement of the said table, and means for actuating said lever to effect the simultaneous lowering of said first and second series of rollers after the glass has been transferred from said cutting section onto said receiving section.

6. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, means for cutting the sheet during the rearward movement of the table, means for simultaneously raising and lowering the first and second series of rollers including a lever and operative connections between said lever and rollers, means for actuating the lever to effect the simultaneous raising of the two series of rollers when the table reaches the end of its rearward cutting stroke thereby raising the sheet from the top of the table and supporting said sheet on the rollers of the cutting section, means for effecting the transfer of the glass from the rollers of the cutting section of the table onto the rollers of the receiving section thereof during forward movement of the said table, means for maintaining both series of rollers in elevated position as the table moves forwardly, and means for actuating said lever to effect the simultaneous lowering of said first and second series of rollers when the table reaches the end of its return stroke.

7. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, a stationary cross member extending transversely above the table, means carried by the cross member for cutting the sheet during the rearward movement of the table, means for simultaneously raising and lowering the first and second series of rollers including a lever and operative connections between said lever and rollers, means for actuating said lever to effect the simultaneous raising of the two series of rollers after the cutting has been completed thereby raising the sheet from the top of the table and supporting said sheet on the rollers of the cutting section, means carried by said cross member for effecting the transfer of the glass from the rollers of the cutting section of the table onto the rollers of the receiving section thereof during forward movement of the said table, and means for actuating said lever to effect the simultaneous lowering of said first and second series of rollers after the glass has been transferred from said cutting section onto said receiving section.

8. In a machine for cutting glass sheets or other sheet material, a reciprocating table for supporting the sheet to be cut including a cutting section and a receiving section, means for reciprocating said table, a series of vertically movable rollers carried by said cutting section, said series of rollers being located under the sheet to be cut at the forward end of the table movement, a series of vertically movable rollers carried by said receiving section, said series of rollers being located in the same plane as the previous series of rollers, a stationary cross member extending transversely above the table, means carried by the cross member for cutting the sheet during the rearward movement of the table, means for simultaneously raising and lowering the first and second series of rollers including a lever and operative connections between said lever and rollers, means for actuating said lever to effect the simultaneous raising of the two series of rollers when the table reaches the end of its rearward cutting stroke thereby raising the sheet from the top of the table and supporting said sheet on the rollers of the cutting section, means carried by said cross member for effecting the transfer of the glass from the rollers of the cutting section of the table onto the rollers of the receiving section thereof during forward movement of the said table, means for maintaining both series of rollers in elevated position as the table moves forwardly, and means for actuating said lever to effect the simultaneous lowering of said first and second series of rollers when the table reaches the end of its return stroke.

9. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, means for cutting the sheet during the rearward movement of the table, means for simultaneously raising the first and second series of rollers after the cutting has been completed whereby to transfer the sheet from said stationary bed to the rollers of said cutting section, means for effecting the transfer of the glass from the rollers of the cutting section onto the rollers of the receiving section during forward movement of the said table, and means for simultaneously lowering said first and second series of rollers after the glass has been transferred from said cutting section onto said receiving section.

10. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, a stationary cross member extending transversely above the table, means carried by the cross member for cutting the sheet during the rearward movement of the table, means for simultaneously raising the first and second series of rollers when the table reaches the end of its rearward cutting stroke whereby to transfer the sheet from said stationary bed to the rollers of said cutting section, means carried by the cross member for effecting the transfer of the glass from the rollers of the cutting section onto the rollers of the receiving section during forward movement of the said table, means for maintaining both series of rollers in elevated position as the table moves forwardly, and means for simultaneously lowering said first and second series of rollers when the table reaches the end of its return stroke.

11. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, means for cutting the sheet during the rearward movement of the table, means for simultaneously raising and lowering the first and second series of rollers including a lever and operative connections between said lever and rollers, means for actuating said lever to effect the simultaneous raising of the two series of rollers after the cutting has been completed whereby to transfer the sheet from said stationary bed to the rollers of said cutting section, means for effecting the transfer of the glass from the rollers of the cutting section onto the rollers of the receiving section during forward movement of the said table, and means for actuating said lever to effect the simultaneous lowering of said first and second series of rollers after the glass has been transferred from said cutting section onto said receiving section.

12. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, a stationary cross member extending transversely above the table, means carried by said cross member for cutting the sheet during the rearward movement of the table, means for simultaneously raising and lowering the first and second series of rollers including a lever and operative connections between said lever and rollers, means for actuating said lever to effect the simultaneous raising of the two series of rollers when the table reaches the end of its rearward cutting stroke whereby to transfer the sheet from said stationary bed to the rollers of said cutting section, means carried by said cross member for effecting the transfer of the glass from the rollers of the cutting section onto the rollers of the receiving section during forward movement of the said table, means for maintaining both series of rollers in elevated position as the table moves forwardly, and means for actuating said lever to effect the simultaneous lowering of said first and second series of rollers when the table reaches the end of its return stroke.

13. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, means for cutting the sheet during the rearward movement of the table, means for simultaneously raising the first and second series of rollers after the cutting has been completed whereby to transfer the sheet from said stationary bed to the rollers of said cutting section, means for effecting the transfer of the glass from the rollers of the cutting section onto the rollers of the receiving section during forward movement of the said table, means for simultaneously lowering said first and second series of rollers after the glass has been transferred from said cutting section onto said receiving section, a plurality of additional rollers carried by the receiving section of the table for receiving the glass thereupon from the second series of rollers upon lowering of the latter, and means for mounting said additional rollers to rotate about axes extending at substantially right angles relative to the axes about which said second series of rollers rotate.

14. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, a stationary cross member extending transversely above the table, means carried by the cross member for cutting the sheet during the rearward movement of the table, means for simultaneously raising the first and second series of rollers when the table reaches the end of its rearward cutting stroke whereby to transfer the sheet from said stationary bed to the rollers of said cutting section, means carried by the cross member for effecting the transfer of the glass from the rollers of the cutting section onto the rollers of the receiving section during forward movement of the said table, means for maintaining both series of rollers in elevated position as the table moves forwardly, means for simultaneously lowering said first and second series of rollers when the table reaches the end of its return stroke, a plurality of additional rollers carried by the receiving section of the table for receiving the glass thereupon from the second series of rollers upon lowering of the latter, and means for mounting said additional rollers to rotate about axes extending at substantially right angles relative to the axes about which said second series of rollers rotate.

15. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, means for cutting the sheet during the rearward movement of the table, means for simultaneously raising and lowering the first and second series of rollers including a lever and operative connections between said lever and rollers, means for actuating said lever to effect the simultaneous raising of the two series of rollers after the cutting has been completed whereby to transfer the sheet from said stationary bed to the rollers of said cutting section, means for effecting the transfer of the glass from the rollers of the cutting section onto the rollers of the receiving section during forward movement of the said table, means for actuating said lever to effect the simultaneous lowering of said first and second series of rollers after the glass has been transferred from said cutting section onto said receiving section, a plurality of additional rollers carried by the receiving section of the table for receiving the glass thereupon from the second series of rollers upon lowering of the latter, and means for mounting said additional rollers to rotate about axes extending at substantially right angles relative to the axes about which said second series of rollers rotate.

16. In a machine for cutting glass sheets or other sheet material, a reciprocating table for supporting the sheet to be cut including a cutting section and a receiving section, means for reciprocating said table, means carried by the cutting section and forming a stationary bed upon which the sheet is supported during cutting, a series of vertically movable rollers carried by said cutting section and normally disposed slightly beneath the upper surface of said bed, a series of vertically movable rollers carried by said receiving section, a stationary cross member extending transversely above the table, means carried by said cross member for cutting the sheet during the rearward movement of the table, means for simultaneously raising and lowering the first and second series of rollers including a lever and operative connections between said lever and rollers, means for actuating said lever to effect the simultaneous raising of the two series of rollers when the table reaches the end of its rearward cutting stroke whereby to transfer the sheet from said stationary bed to the rollers of said cutting section, means carried by said cross member for effecting the transfer of the glass from the rollers of the cutting section onto the rollers of the receiving section during forward movement of the said table, means for maintaining both series of rollers in elevated position as the table moves forwardly, means for actuating said lever to effect the simultaneous lowering of said first and second series of rollers when the table reaches the end of its return stroke, a plurality of additional rollers carried by the receiving section of the table for receiving the glass thereupon from the second series of rollers upon lowering of the latter, and means for mounting said additional rollers to rotate about axes extending at substantially right angles relative to the axes about which said second series of rollers rotate.

EDWIN A. ROSIN.